United States Patent [19]

Sparrow et al.

[11] Patent Number: 5,087,404
[45] Date of Patent: Feb. 11, 1992

[54] METHOD FOR MOLDING ON CARRIER STRIP MATERIAL

[75] Inventors: Tim H. Sparrow, Harrodsburg; Richard L. Harlow, Lex; Don Wilder, Versailles; Kevin D. Jackson, Lexington, all of Ky.

[73] Assignee: YKK Corporation, Lyndhurst, N.J.

[21] Appl. No.: 444,298

[22] Filed: Dec. 1, 1989

[51] Int. Cl.$^5$ .............................................. B29C 41/20
[52] U.S. Cl. .......................................... 264/219; 29/4; 264/156; 264/271.1; 264/278; 264/297.2; 264/328.8; 264/328.11
[58] Field of Search ............ 264/259, 251, 156, 155, 264/271.1, 273, 328.11, 328.8, 153, 266, 166, 219, 297.2, 278; 425/290; 29/4, 414, 409, 410

[56] References Cited

U.S. PATENT DOCUMENTS

| | | | |
|---|---|---|---|
| Re. 32,500 | 9/1987 | Takata . | |
| 249,850 | 11/1881 | McGill | 24/76 |
| 251,911 | 1/1882 | McGill | 24/76 |
| 320,451 | 6/1885 | Walter | 24/94 |
| 329,744 | 11/1885 | Ivins | 24/94 |
| 977,615 | 12/1910 | Goss | 24/94 |
| 1,610,295 | 12/1926 | Latham | 264/153 |
| 1,931,728 | 10/1953 | Johnson | 411/498 |
| 2,551,094 | 5/1951 | Bryce et al. | 264/155 |
| 3,002,246 | 10/1961 | Carpinella et al. | 24/216 |
| 3,489,829 | 1/1970 | Lipfert | 264/273 |
| 3,526,694 | 9/1970 | Lemelson | 264/259 |
| 3,800,021 | 3/1974 | Monett et al. | 264/273 |
| 3,954,923 | 5/1976 | Valvi | 264/94 |
| 3,997,052 | 12/1976 | Eddy et al. | 264/251 |
| 4,008,302 | 2/1977 | Erlichman | 264/251 |
| 4,061,706 | 12/1977 | Duffield et al. | 264/90 |
| 4,315,885 | 2/1982 | Lemelson | 264/297 |
| 4,332,847 | 6/1982 | Rowland | 428/156 |
| 4,416,843 | 11/1983 | Helms | 264/153 |
| 4,477,243 | 10/1984 | Wallsten | 425/292 |
| 4,525,231 | 6/1985 | Wnuk | 264/145 |
| 4,580,320 | 4/1983 | Takata | 24/113 MP |
| 4,585,606 | 4/1986 | Cornell et al. | 264/156 |
| 4,606,097 | 8/1986 | Lam et al. | 24/108 |
| 4,657,625 | 4/1987 | Kawakami | 156/471 |
| 4,705,469 | 11/1987 | Liebl et al. | 264/273 |
| 4,921,671 | 5/1990 | Staheli | 264/156 |

FOREIGN PATENT DOCUMENTS

| | | |
|---|---|---|
| 2630824A1 | 3/1988 | Fed. Rep. of Germany . |
| 2626810 | 11/1989 | France . |
| 36-9981 | 7/1961 | Japan . |
| 38-6715 | 4/1963 | Japan . |
| 51-47185 | 12/1976 | Japan . |
| 53-25603 | 6/1978 | Japan . |
| 818246 | 8/1959 | United Kingdom . |

OTHER PUBLICATIONS

Patent Abstracts of Japan, vol. 9, No. 7 (M-350) 1730, Jan. 12, 1985; and JP-A-59 158 238 (Matsushita Denko K.K.) 9/7/84.

Primary Examiner—Jeffery Thurlow
Attorney, Agent, or Firm—Hill, Van Santen, Steadman & Simpson

[57] ABSTRACT

A method for molding plastic caps onto preformed metallic shanks, the metallic shanks having a head portion and a leg portion, wherein the leg portion of the shanks are inserted into a carrier member leaving a portion of the head portion elevated from the carrier member. A molding device is thereafter engaged with the carrier member over the head of the shank to form a molding cavity therearound. Plastic is then injected into the mold cavity to surround and encapsulate the head portion. The mold cavity is thereafter open and the completed capped shank is removed from the carrier member. The carrier member can comprise an elongated strip which can be pulled through work stations performing the various forming, inserting and injecting steps in regulated fashion.

17 Claims, 6 Drawing Sheets

FIG.12c-2 (a-a SECTION)

METHOD FOR MOLDING ON CARRIER STRIP MATERIAL

BACKGROUND OF THE INVENTION

This invention relates to button forming and more particularly to injection molding a button head on a preformed metallic shank.

Providing buttons having a preformed shank consisting of one or more protruding legs to be inserted into a second button part, and a head portion covered with a plastic material are well known in the art. For example, such a button construction is shown in U.S. Pat. No. 4,580,320 which describes a method for forming such a plastic covered button by first preforming the button shank and also preforming the plastic head covering and then subsequently snapping the head covering onto the head. Such an arrangement has many disadvantages. First, precise tolerances must be maintained between the size of the metallic head and the opening preformed in the plastic covering to assure that the plastic head covering will in fact snap onto the head and be retained thereon. If the metallic head is too large or the opening is too small, the cap will not easily be inserted onto the metallic head. If the metallic head is too small or the cap opening too large, the cap will not be retained on the head. Further, forming both the metallic portion and plastic portion as separate pieces and later joining them results in assembly difficulties in requiring that the small plastic caps be oriented and held precisely in order to cause them to be snapped onto the metallic heads.

Additionally, the metallic head must be symmetric (round) in order to be easily assembled with the plastic cap. It would be very difficult or impossible to assemble the shank head as it exists to a plastic cap. Surrounding the shank head with plastic as taught by the present invention is an excellent way to hold the shank head in the plastic cap.

Finally, the shank geometry makes it impossible to "insert mold" this item according to known molding methods. The only way to effectively seal the shank leg in the molding operation is to pierce a metal strip with the shank leg, as now taught by the present invention, thus effecting a seal.

SUMMARY OF THE INVENTION

It is an object of the present invention to provide new and improved methods and apparatuses wherein all of the drawbacks of the prior art have been overcome.

It is a further object of the invention to provide new and improved methods and apparatuses wherein preformed button shanks of a button can be retained easily by a mold during the process of injection molding.

It is a still further object of the present invention to provide new and improved methods and apparatuses wherein the preformed shanks of the button can be retained by a mold which is completely sealed against leakage of molten plastic during the process of injection molding.

It is a still further object of the present invention to provide new and improved methods and apparatuses wherein the preformed shanks of the button can be retained very easily.

It is a still further object of the present invention to provide new and improved methods and apparatuses wherein continuous injection molding can be carried out.

It is a still further object of the present invention to provide new and improved methods and apparatuses wherein massproduction of capped buttons can be effected.

These and other objects of the present invention are achieved in that the present invention provides new and improved methods and apparatuses whereby preformed metallic shanks are covered with plastic head coverings in an injection molding step wherein the cap is molded directly onto the head portion of the preformed button shank such that no separate assembly step between the plastic cap and metal head is required.

Not only does this assembly method avoid the necessity of assembling the two preformed pieces as in the prior art, such an assembly procedure also obviates the need for maintaining precise tolerances in that the cap will be molded directly to the preformed metallic head regardless of the size of the metallic head. This will assure that the plastic cap will always be retained on the metallic head and, since the plastic material can be molded completely or at least partially around the metallic head, the possibility of separation of the cap and metal shank will be completely avoided. In order to perform the assembly and molding process, the metallic shanks are preformed, the preferred embodiment having a shank with two tapered legs or prongs joined by an enlarged head. A carrier member of strip material is utilized not only to carry the preformed shank portion of the button to the molding station, but it also forms a portion of the mold and seals the two tapered legs.

The invention provides a method for forming a plastic capped shank from a metallic shanked member having a head portion and a leg portion, comprising the steps of inserting the leg portion of the member into a carrier member such that at least a part of the head portion of the shanked member is elevated above the carrier member and the leg portion is sealed for molding purposes by the carrier member; covering the head portion with a mold cavity which engages the carrier member such that the carrier member forms a portion of the mold; injecting a plastic material into a mold cavity to encompass at least said elevated part of the head portion of the shank to form a capped shank; disengaging the mold cavity from the carrier member to expose the capped shank; and removing the capped shank from the carrier member.

The invention also provides an apparatus for applying a plastic cap to a shank, wherein said shank has a head and at least one leg comprising a supply of strip material; a shank insertion device having means for inserting said legs of said shanks into said strip material such that at least a portion of said heads of said shanks are elevated above said raised contours; a molding device having means for molding plastic caps onto said elevated heads of said shanks; and means for drawing said strip material from said supply and feeding it to shank insertion device and molding device.

The invention also provides a capped shank which can be formed by the above method and apparatus comprising a head portion; a leg portion and a plastic cap portion molded onto and at least partially encapsulating said head portion.

More specifically, a thin metallic strip of material may be used as the carrier member in an embodiment wherein the strip material is supplied in a large roll and is fed into a first preforming station which optionally stamps a contour into the strip material in the form of a raised circular area and, preferably, forms four such contours at one time in the strip material in a 2×2 matrix. The strip material is then indexed toward a shank insertion device which feeds four preformed shanks into a retaining head. The retaining head is reciprocated toward and away from the strip material. The preformed shanks are driven into the raised areas on the strip material by the insertion device and released such that the head of each shank is positioned slightly above the raised circular portion of the strip material with the legs protruding through such circular portion. The tapered nature of the legs holds the shanks securely in position on the raised portions. The strip material is then indexed to a molding device which includes an open mold cavity reciprocable toward and away from the strip material. When the mold is moved down into engagement with the strip material, the mold cavities overlie the raised portions on the strip material and a plastic material is injected into the mold cavity to surround the elevated head portion of the shank and to form the cap portion of the button.

Subsequently the mold is moved away from the strip material and the strip material is indexed toward a removal station where the buttons are removed from the strip material for further use.

BRIEF DESCRIPTION OF THE DRAWINGS

FIGS. 12a-13b are schematic perspective and sectional views of alternative embodiments of a button shank in which the present invention may be embodied.

DETAILED DESCRIPTION OF THE PREFERRED EMBODIMENTS

Figure 1:
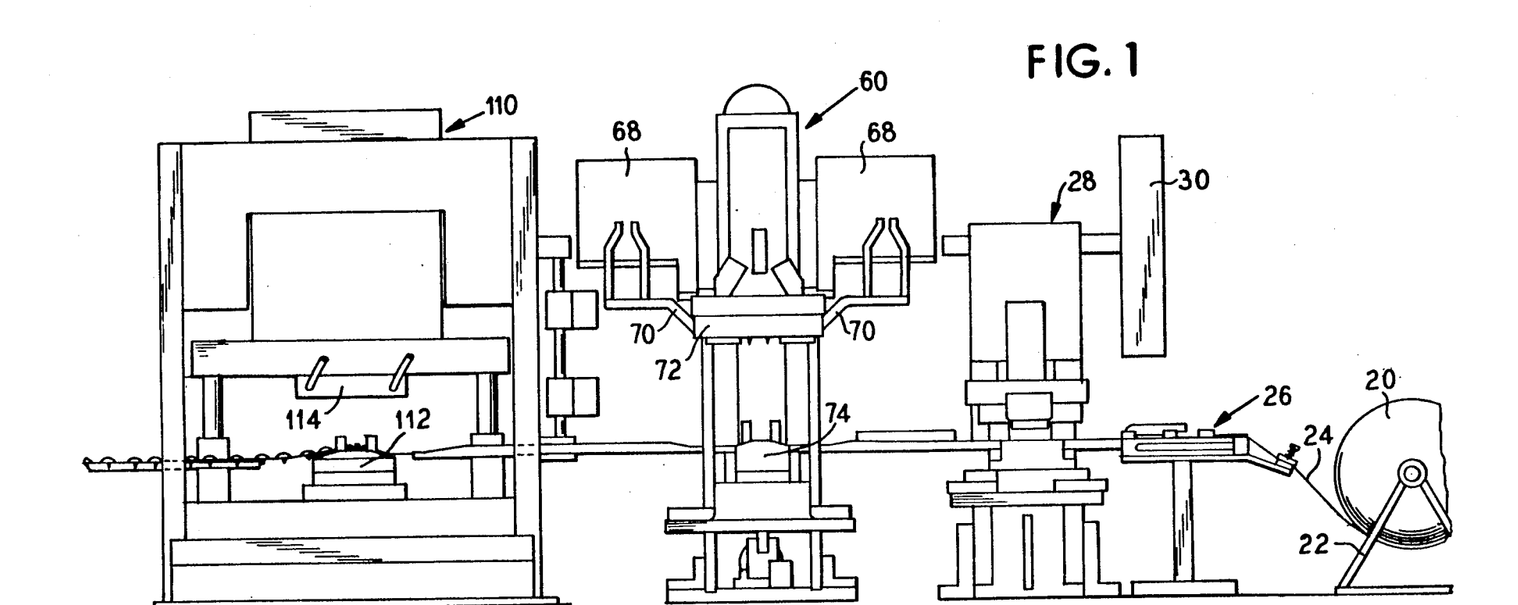
FIG. 1 is an elevational view of the various apparatus used in manufacturing a button head molded on a shank carried by a strip material embodying the principles of the present invention.

In FIG. 1 there is illustrated a series of devices useful in molding a plastic button head onto a metallic button shank through the use of a carrier strip material. A roll 20 of strip material 24 is rotatably carried on a support frame 22 such that the strip material 24 can be drawn from the roll by means of a feeder mechanism 26 which clampingly engages the strip material 24 and incrementally and intermittently pulls it from the roll 20 and pushes it toward an optional strip material contour forming device 28 in discrete movements of a start and stop fashion. Preferably the strip material is sufficiently thick so as to hold its shape during the forming and molding steps described below.

Figure 2:
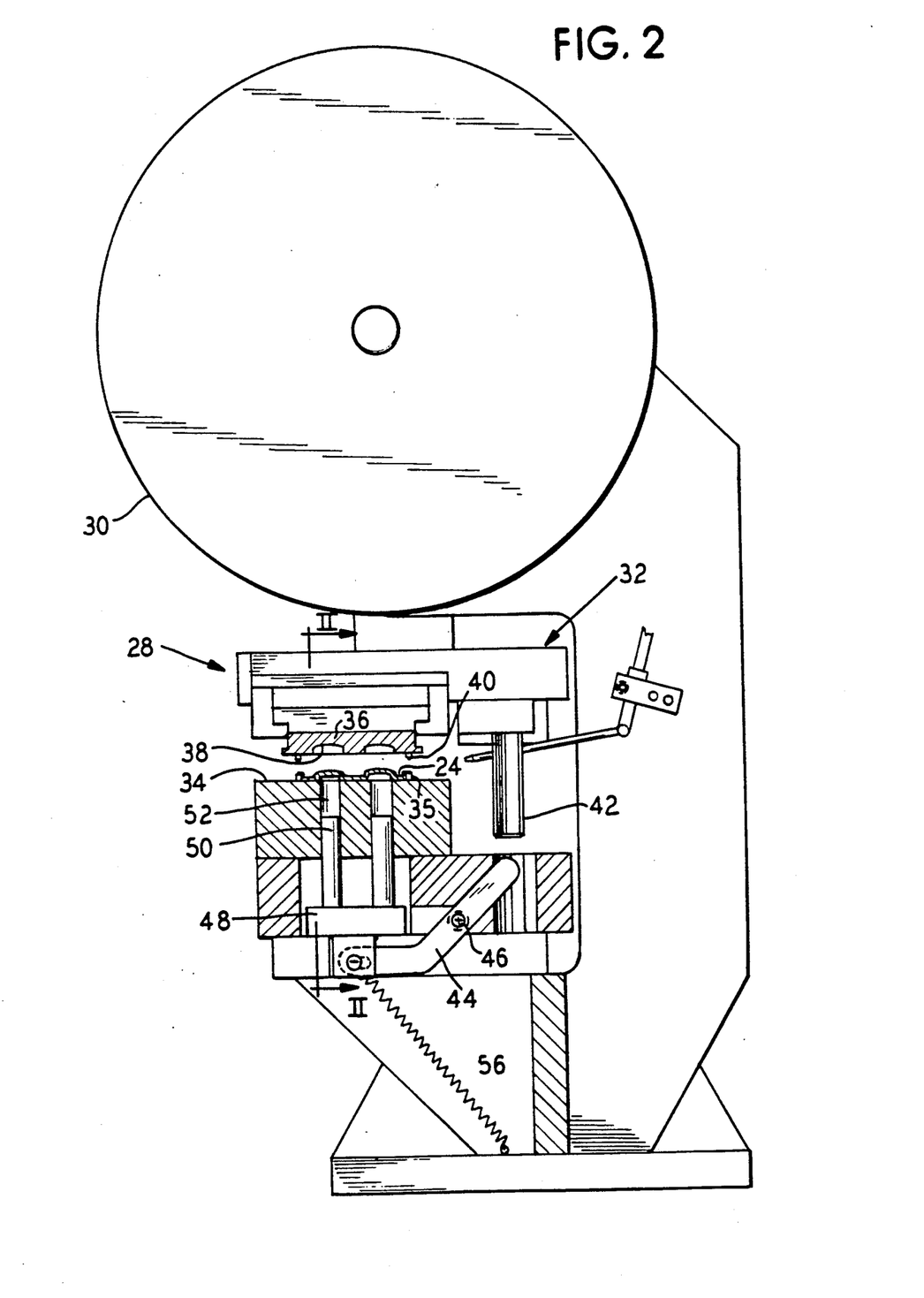
FIG. 2 is a side sectional view of the strip material shaping station shown in FIG. 1.
Figure 3:
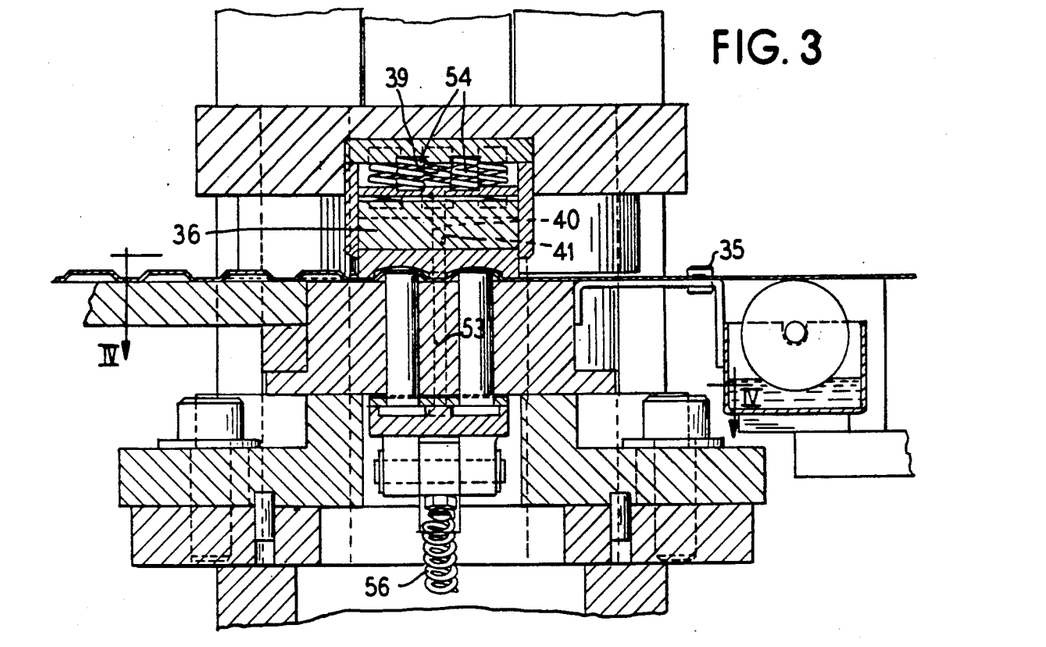
FIG. 3 is a sectional view of the strip material shaping device taken generally along the line III—III of FIG. 2.
Figure 4:
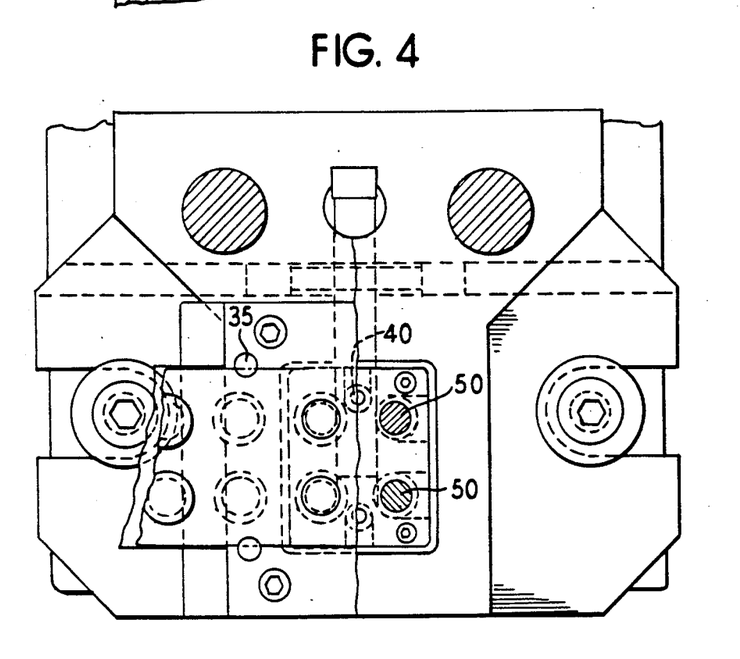
FIG. 4 is a sectional view of the strip material shaping device taken generally along the line IV—IV of FIG. 3.

The strip material contour forming or shaping device 28 is also shown in detail in FIGS. 2-4 and generally comprises a press member having a fly wheel 30 for storing energy to be used in the forming process. When the strip material 24 is incrementally indexed into the contour forming device 28, an upper ram portion 32 linked by a crank to the fly wheel 30 is caused to move downwardly toward the strip material which is guided on a strip supporting anvil block 34 by guides 35. The ram 32 carries a die plate 36 having downwardly opening die openings 38 positioned over the strip material 24. The die plate 36 also has a pair of downwardly projecting pins 40 carried in vertical passages 41 and biased downwardly therein by springs 39 to engage against the strip material.

Figure 11:
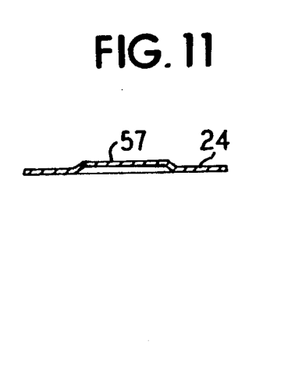
FIG. 11 is a side sectional view of the contoured strip material.

As the ram 32 moves down, a downwardly depending post 42 engages a pivotally mounted crank arm 44 which rotates about pivot pin 46 and which is pivotally and slidably connected to a punch pin carrier 48. The punch pin carrier 48 carries a plurality of upwardly projecting punch pins 50 guided in the anvil block 34 in passages 52 which align with die openings 38 in the die plate 36. Thus, as the ram moves downwardly, the post 42 engages the crank arm 44 and causes the punch pins 50 to move upwardly along the passages 52 and to strike the underneath side of the strip material 24 so as to deform the strip material as illustrated in FIGS. 3 and 11. The die plate 36 is mounted by springs 54 so as to absorb upward movement of the punch pins 50 against the die plate 36.

A pair of second pins 53 are also carried by the punch pin carrier 48, which pins 53 align with passages 41 in the die plate 36. These second pins 53 pierce through the strip material 24 to form indexing holes therein.

As the ram 32 travels upwardly, the die plate 36 is moved away from the strip material 24 and, a spring 56 pulls the punch pin carrier 48 downwardly to retract the punch pins 50 from the strip material 24 so that the strip material may be moved through the punching station. The springs 39 press the pins 40 downwardly, ejecting the punched material of the index holes from the die plate 36. Thus, at this station a plurality (preferably four) raised contour areas 57 are formed in the carrier strip material, comprising four raised circular areas. The purpose of these raised areas is described below in the section relating to the molding process. Also, two indexing holes are simultaneously formed to assure consistent and accurate positioning of all carrier strip material features and assembly components. The strip material 24 is then indexed a sufficient amount to provide new material in the contour forming station for sequentially forming additional raised areas and indexing holes.

Figure 5:
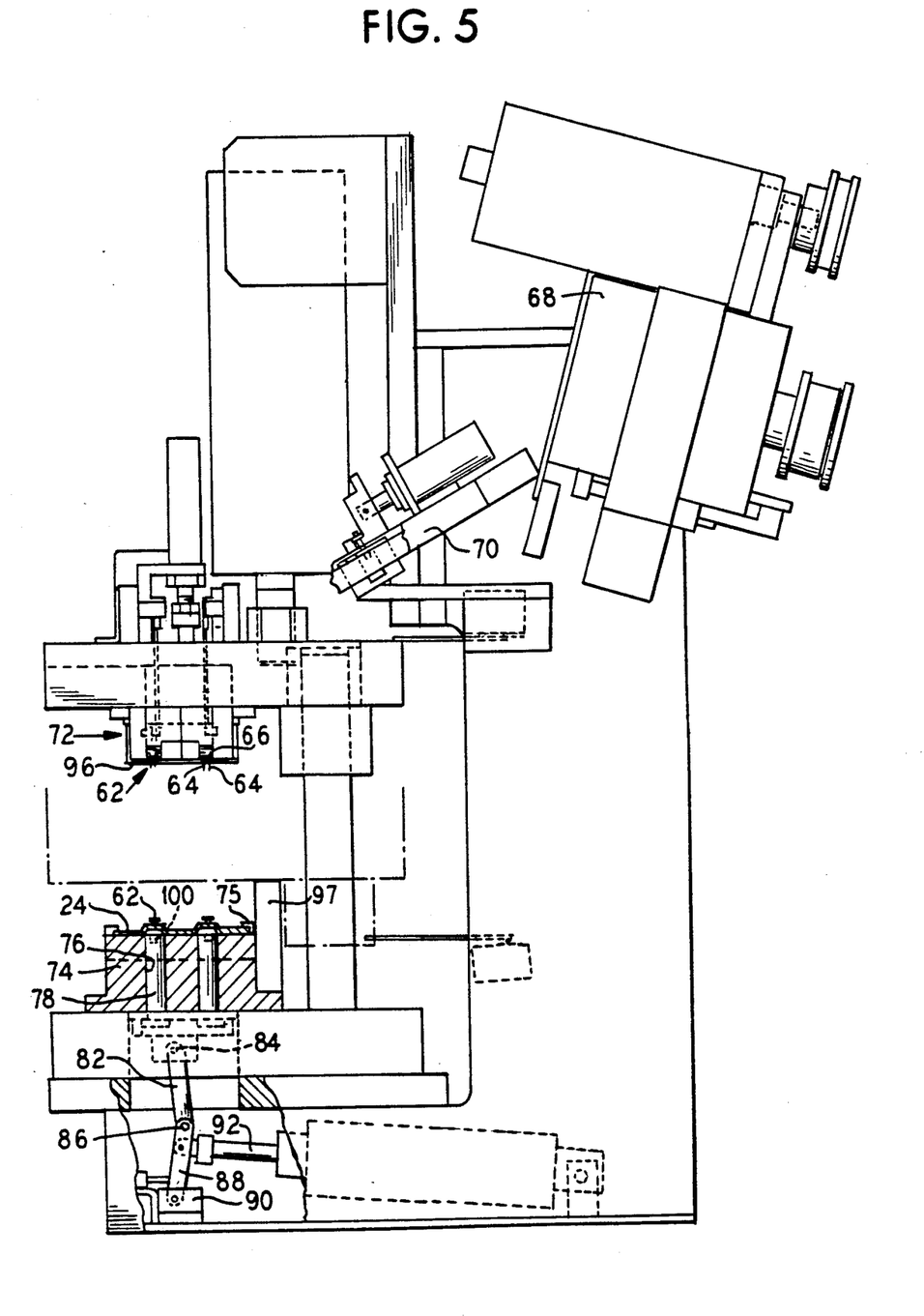
FIG. 5 is a side elevational view of the shank insertion device of FIG. 1.
Figure 6:
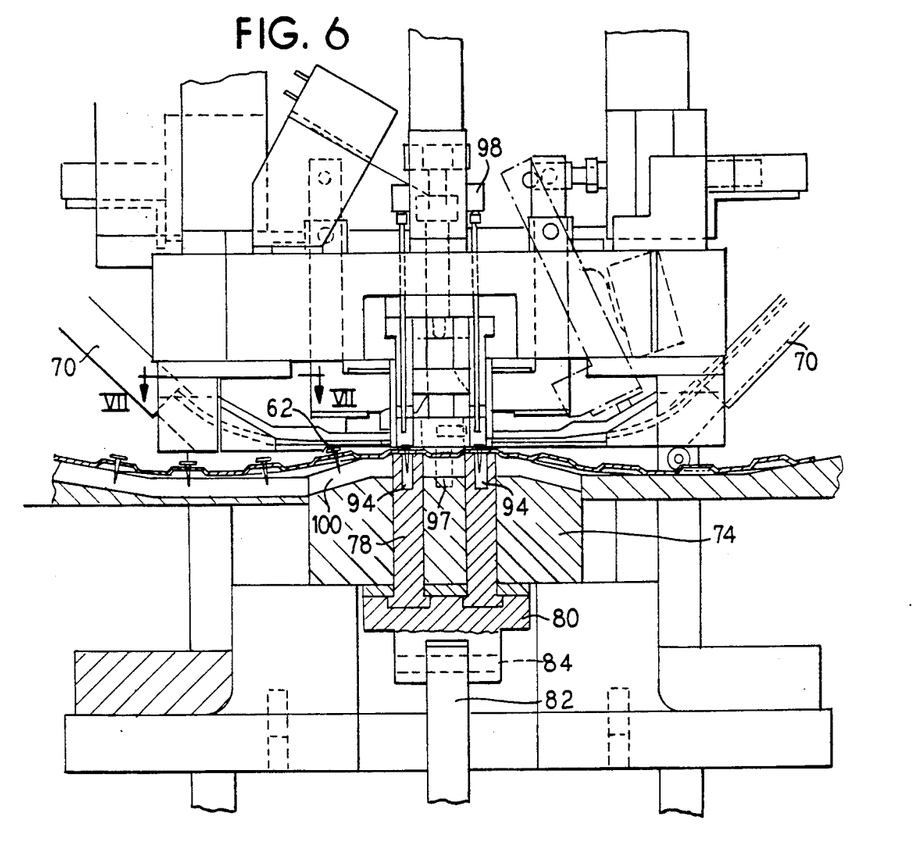
FIG. 6 is a front sectional view of the insertion device of FIG. 5.
Figure 7:
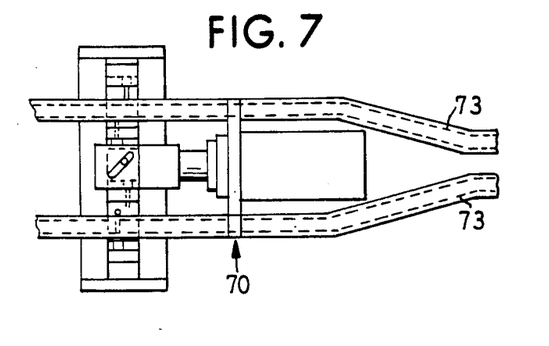
FIG. 7 is a sectional view of the insertion device taken generally along the line VII—VII of FIG. 6.
Figure 10:
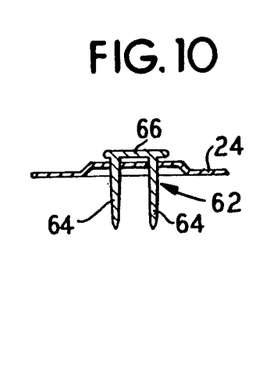
FIG. 10 is a sectional view of the strip material with the button shank inserted.

Referring back to FIG. 1, the strip material is indexed toward a shank insertion station 60, which station is shown in greater detail in FIGS. 5-7. Preformed button shanks 62 having a pair of legs 64 depending from an enlarged head portion 66 are held in supply reservoirs 68 and are incrementally supplied through feeding means 70 to a retaining head 72. In the preferred embodiment illustrated, four button shanks are held in the retaining head 72 at one time. The two separate feeding means 70 each incrementally deliver two spaced apart shanks 62 on slides 73. The retaining head 72 is reciprocable toward and away from the strip material 24 which is horizontally positioned on a top surface of a block 74 by guides 75. The block 74 has four vertical passages 76 therein for reciprocably receiving four vertical pins 78. The pins 78 are carried on a pin carrier 80 which is supported on an arm 82, being pivotally connected thereto by pivot pin 84. The arm 82 is pivotally connected at 86 to a second, lower arm 88 which in turn is pivotally mounted on a support block 90. A pneumatic or hydraulic plunger 92 is connected to the lower arm 88 to cause the lower arm to pivot on the support member 90, thus alternatively lowering and raising arm 82, thus lowering and raising pins 78. The pins 78 each have a pocket 94 formed at a top end thereof. The shank retaining head 72 is movable toward the strip material 24 and normally holds four button shanks 62 such that the legs 64 protrude from a bottom edge 96 of the retainer 72. The heads 66 are retained above the bottom edge 96. As the retainer 72 moves downwardly, the pins 78 are pressed upwardly to engage and support the raised portions of the strip material 24 as the button shank legs 64 are driven through the strip material 24. The bottom edge 96 of the retaining head 72 engages the raised portion 57 of the strip material 24, thus stopping further downward movement of the retainer 72 and the shank head 66 are thus positioned above the surface of the strip material 24. The gap thus provided between he shank heads and the strip material is initially provided by a die stop 97 at this shank insertion station. The final depth control is provided by a shank positioning ram 98 that pushes the head to the proper depth for molding as best seen in FIG. 6. As the retaining head 72 moves up and away from the strip material 24, the button shanks are released so that they are held in the strip material 24 as shown in FIG. 10 and the pins 78 are withdrawn downwardly so as to permit the legs to move unhindered through a groove 100 formed in the block 74. The strip material 24 is then incrementally moved to present four new raised portions 57 to the shank insertion device 60.

Referring back to FIG. 1, the strip material 24 is then indexed toward a molding device 110 which includes a lower support block 112 for supporting a bottom side of the strip material 24. An upper mold member 114 is movable downwardly to engage with the strip material 24 and has four downwardly opening mold cavities 116 (FIG. 9), each of which have a passage 118 therein for injection of a plastic material. The mold member 114 engages the top surface of the strip material 24, annularly spaced from the raised contour areas 57, the strip material thus forming a portion of the mold. The head 66 of the button shank 62, being elevated above the top surface of the strip material 24, and, more particularly, above the raised contour area, thus receives plastic material in a surrounding manner such that a plastic cap 120 (FIG. 8) is formed completely enclosing and encapsulating the head.

Figure 8:
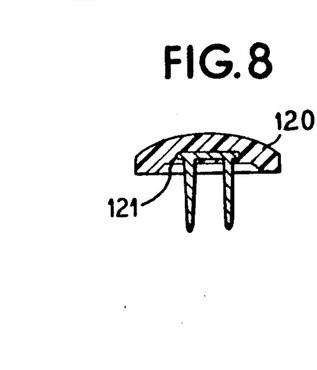
FIG. 8 is a side sectional view of a completed button.
Figure 9:
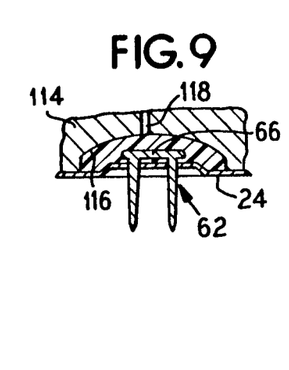
FIG. 9 is a side sectional view of the molding operation with the mold covering the metallic shank and engaging the strip material.

Although FIG. 8 shows the head 66 of the button shank completely encapsulated by plastic, it is not necessary for the head of the shank to be complete encapsulated by plastic during the molding process. It is only necessary that a sufficient portion of an underside of the head as shown in FIG. 8, be enclosed within the plastic to capture the head 66 within the plastic cap 120 to assure that the plastic cap 120 will be securely retained on the shank head 66. Thus, in order for the plastic to form around a portion of an underside of the head, the head 66 need only have a portion of its underside raised above the carrier strip material. This criteria is more clearly illustrated in the alternate embodiments of FIGS. 12a, 12b, 12c-1, 12c-2, 12d, 13a and 13b described hereinafter.

Figure 8A:
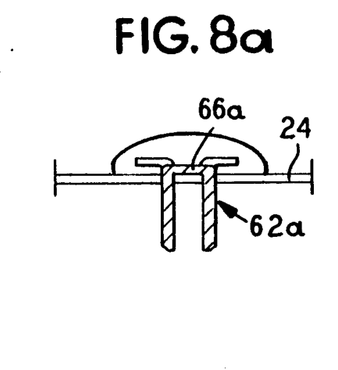
FIG. 8a is a side sectional view of a completed button using an alternative shank as shown in FIGS. 12a-13b.
Figure 9A:
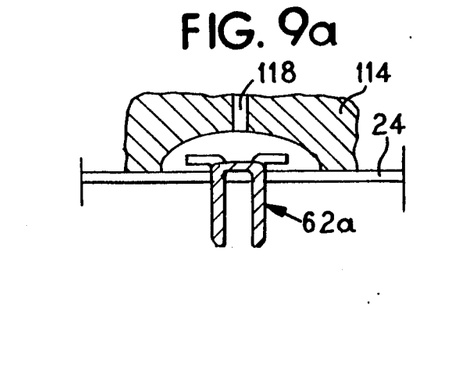
FIG. 9a is a side sectional view of the molding operation with the mold covering the alternative metallic shank of FIGS. 12a-13b and engaging the strip material.
Figure 10A:
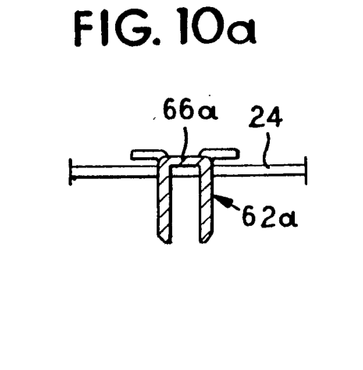
FIG. 10a is a sectional view of the strip material with the alternative button shank of FIGS. 12a-13b inserted.
Figures 12A, 12D:
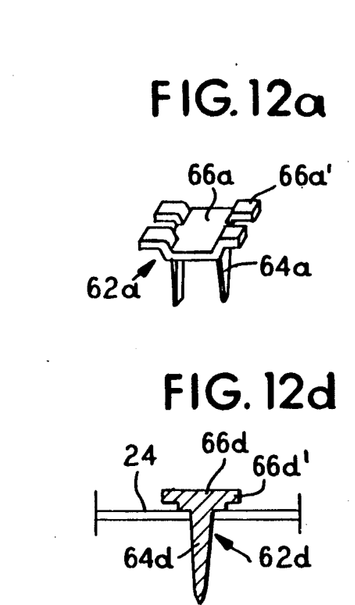
Figure 12B:
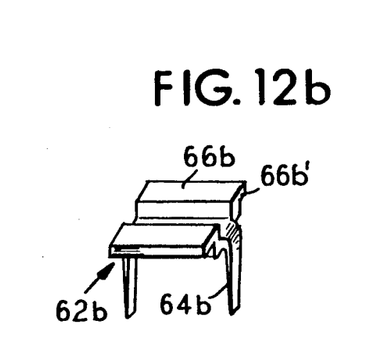
Figure 12C:
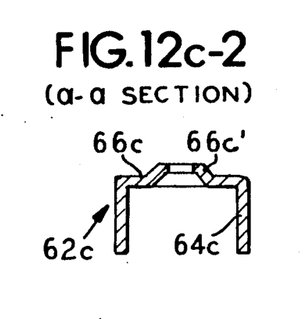
Figure 12C:
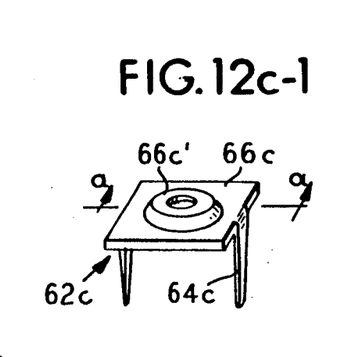
Figure 13A:
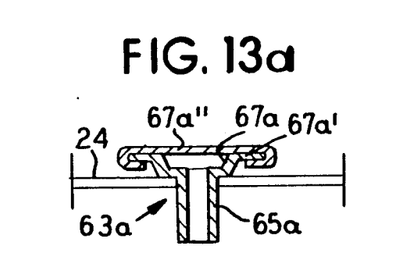
Figure 13B:
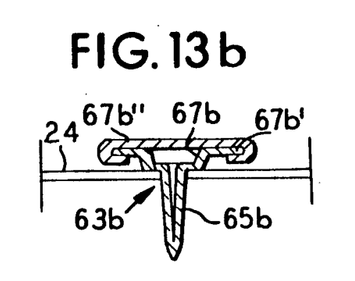

Several alternative embodiments of headed shanks are illustrated in FIGS. 12a, 12b, 12c-1, 12c-2, 12d, 13a, and 13b which have only a portion of the shank head in an elevated position. For example, FIG. 12a shows a shank 62a with two legs 64a and a head 66a formed with four separate elevated wing portions 66a'. FIG. 12b shows a shank 62b with two legs 64b and a head 66b formed with two spaced and continuous width wing portions 66b'. FIGS. 12c-1 and 12c-2 show a shank 62c with two legs 64c and a head 66c formed with a central apertured raised portion 66b' which can receive a charge of plastic in the underside of the raised portion. FIG. 12d shows a shank 62d with at least one leg 64d and a head 66d formed with an undercut portion 66d' which may be annular if the head 66d is circular, or may be two spaced apart undercut portions 66d'. FIG. 13a shows a shank 63a with one central hollow and open leg 65a and a head 67a formed with an undercut portion 67a' and covered by a crimped cap 67a''. FIG. 13b shows a shank 63b with one central hollow, but closed leg 65b and a head 67b formed with an undercut portion 67b' and covered by a crimped cap 67b''. The positions of these various embodiments relative to the carrier strip material 24 are represented by the FIGS. 8a, 9a and 10a, wherein a portion of the head 66a (for example) is in direct contact with the strip material and a portion is elevated above the strip material. Namely, the various embodiments as shown in FIGS. 12a-12d and 13a and 13b need not have the entire width of the head elevated above the strip material for the purpose of receiving a change of plastic under the head.

As the mold member 114 is moved upwardly away from engagement with the strip material 24, after the plastic has been injected into the mold cavity 116, the strip material 24 can then be incrementally advanced away from the molding station and eventually will be indexed to a station wherein the plastic capped shank will be removed from the strip material. The raised contour areas 57 form a recessed area 121 at a lower side of the capped shank (FIG. 8) which allows the button head to be attached closer to the fabric in use. Of course it is not necessary to have the recess and therefore the raised contour areas 57 on the carrier strip material are not critical to the present invention.

With respect to the embodiments shown in FIGS. 13a and 13b, it is also clear that the invention is not limited to shanks having pointed legs that can be driven into the carrier strip material. If the invention is embodied in a headed eyelet as shown in FIG. 13a or a headed hollow shank as shown in FIG. 13b, the strip material 24 needs to be provided with a plurality of rows of holes prior to the shank insertion step, and preferably during the carrier strip material forming or shaping step. The holes should be equal to or slightly smaller than the diameter of the leg (65a or 65b) of the button shank (63a or 63b). Thereafter, all of the same steps are followed as described above.

Thus, it is seen that the present invention provides a method and apparatus for forming a capped shank by an injection molding process wherein the shank is carried by a strip material in a precise orientation to be elevated in a mold cavity such that the plastic material will be injected into the mold cavity to completely encase the head of the button shank. As a result, a plastic headed button is provided having the plastic head completely molded onto and encompassing the metal head of the button shank such that the plastic cap cannot be removed from the button shank without destruction thereof.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method for forming a plastic capped shank from a metallic shanked member having a head portion and a leg portion, comprising the steps:
   (A) providing a carrier member and forming a raised contour in a top surface of a carrier member;
   (B) removably inserting the leg portion of the member into said carrier member, through a top surface on said contour such that at least a part of the head portion of the shanked member is elevated above the carrier member and the leg portion is sealed for molding purposes by the carrier member;
   (C) covering the elevated head portion with a mold cavity which engages the carrier member such that the carrier member forms a portion of the mold;
   (D) injecting a plastic material into the mold cavity to encompass at least said elevated part of the head portion of the shank to from a capped shank;
   (E) disengaging the mold cavity from the carrier member to expose the capped shank; and
   (F) removing the capped shank from the carrier member.

2. A method according to claim 1, wherein said raised contour comprises a circular area.

3. A method according to claim 1, wherein said leg portion is inserted into said raised contour of said carrier member.

4. The method according to claim 3, wherein said mold cavity surrounds and receives the raised contour.

5. A method according to claim 1, wherein a plurality of capped shank members are operated on at the same time in each step.

6. A method according to claim 1, wherein said carrier member is moved to separate stations where the forming, inserting and injecting steps are performed.

7. A method according to claim 1, further comprising the step of forming an aperture for receiving said shank leg portion in said carrier member prior to inserting the leg portion into the carrier member.

8. A method for forming plastic capped shanks from a plurality of shanked members each having a head portion and a leg portion, comprising the steps:
   (a) provide a carrier member;
   (b) deform the carrier member to provide thereon a plurality of raised contour areas;
   (c) removably insert leg portions of a plurality of shanked members into the carrier member one at each raised contour area, such that at least a part of the head portion of each shanked member is elevated above the carrier member and the leg portion of each is sealed to the carrier member;
   (d) cover the elevated head portions with a mold cavity which engages the carrier member such that the carrier member forms a portion of the mold;
   (e) inject a plastic material into the mold cavity to encompass at least said elevated part of each head portion of the shanked members to form capped shanks;
   (f) disengaged the mold cavity from the carrier member to expose the capped shank; and
   (g) remove the capped shank from the carrier member.

9. A method according to claim 8, wherein said carrier member comprises an elongate strip of deformable material; and said deforming step to provide the plurality of raised contour areas comprises a punching step.

10. A method according to claim 8, wherein each of said steps is performed at a separate station and said carrier member is drawn through said stations where the steps are performed.

11. A method according to claim 8 further comprising the step of forming an aperture for receiving said shank leg portion into said carrier member prior to inserting the leg portion into the carrier member.

12. A method for forming plastic capped shanks from shanked members each having a head portion and a leg portion, comprising the steps:
   (A) providing an elongate carrier member and removably inserting the leg portion of each member into the carrier member such that at least a part of the head portion of the shanked member is elevated above the carrier member and the leg portion is sealed for molding purposes by the carrier member;
   (B) incrementally drawing in a linear direction the carrier member holding the metallic shanked members beneath a mold cavity;
   (C) covering the elevated head portions of the shanked members with the mold cavity which engages the carrier member such that the carrier member forms a portion of the mold;
   (D) injecting a plastic material into the mold cavity to encompass at least said elevated part of the head portions of the shanked members to form capped shanks;
   (E) disengaging the mold cavity from the carrier member to expose the capped shanks;
   (F) drawing the carrier member out of the disengaged mold cavity along said linear direction; and
   (G) removing the capped shanks from the carrier member.

13. A method according to claim 12 further comprising the step of forming contours in the shape of raised circular areas in a top surface of the carrier member prior to inserting the leg portions of the shanked members into the carrier member, one leg portion into each circular area.

14. A method according to claim 13, wherein said mold cavity surrounds and receives a plurality of the raised circular areas.

15. A method according to claim 12, wherein a plurality of capped shank members are operated on at the same time in each step.

16. A method according to claim 12, wherein said carrier member is drawn to separate stations where the forming, inserting and injecting steps are performed.

17. A method according to claim 12, further comprising the step of forming apertures for receiving said leg portions in said carrier member prior to inserting the leg portions into the carrier member.

* * * * *